US007474984B2

(12) United States Patent
Freifeld

(10) Patent No.: US 7,474,984 B2
(45) **Date of Patent: *Jan. 6, 2009**

(54) RACECOURSE LAP COUNTER AND RACECOURSE FOR RADIO CONTROLLED VEHICLES

(76) Inventor: Daniel Freifeld, 2960 Redwood Rd., Napa, CA (US) 94558

( * ) Notice: Subject to any disclaimer, the term of this patent is extended or adjusted under 35 U.S.C. 154(b) by 0 days.

This patent is subject to a terminal disclaimer.

(21) Appl. No.: 11/448,392

(22) Filed: Jun. 7, 2006

(65) Prior Publication Data

US 2006/0229843 A1 Oct. 12, 2006

Related U.S. Application Data

(62) Division of application No. 10/746,597, filed on Dec. 23, 2003, now Pat. No. 7,072,792.

(60) Provisional application No. 60/436,351, filed on Dec. 24, 2002.

(51) Int. Cl.
*G06F 15/00* (2006.01)
*A63F 9/24* (2006.01)
*G08B 23/00* (2006.01)

(52) U.S. Cl. .................... 702/178; 340/573.1; 455/500; 463/6

(58) Field of Classification Search ................. 702/176, 702/178, 177; 73/167; 235/377; 238/10; 250/559.29; 340/468, 573.1, 539.1, 588, 340/446, 513.1, 870.28, 988; 342/44, 457; 404/6; 406/3, 6, 59; 377/100; 455/500
See application file for complete search history.

(56) References Cited

U.S. PATENT DOCUMENTS

| | | | | |
|---|---|---|---|---|
| 3,206,122 | A | 9/1965 | Frisbie et al. | 238/10 F |
| 3,399,405 | A | 8/1968 | Daniel, Jr. | 342/44 |
| 3,400,667 | A | 9/1968 | Case et al. | 463/59 |
| 4,349,196 | A | 9/1982 | Smith, III et al. | 463/3 |
| 4,449,114 | A | 5/1984 | Fascenda et al. | 340/988 |
| 4,515,499 | A | 5/1985 | Furiate | 404/6 |
| 5,140,307 | A | 8/1992 | Rebetez et al. | 340/539.1 |
| 5,194,861 | A | 3/1993 | St. Clair | 340/870.28 |
| 5,214,793 | A * | 5/1993 | Conway et al. | 455/500 |
| 5,241,487 | A | 8/1993 | Bianco | 702/178 |
| 5,245,162 | A | 9/1993 | Takahashi | 235/377 |
| 5,435,553 | A | 7/1995 | Arima et al. | 463/6 |
| 5,698,861 | A | 12/1997 | Oh | 250/559.29 |
| 5,800,263 | A | 9/1998 | Hayashida et al. | 463/6 |
| 5,827,958 | A | 10/1998 | Sigler | 73/167 |
| 6,002,336 | A | 12/1999 | Widding et al. | 340/573.1 |
| 6,020,851 | A | 2/2000 | Busack | 342/457 |
| 6,411,205 | B1 | 6/2002 | Reid | 340/468 |
| 7,072,792 | B2 * | 7/2006 | Freifeld | 702/178 |

* cited by examiner

FOREIGN PATENT DOCUMENTS

WO 90/14643 A1 11/1990

*Primary Examiner*—John H Le
(74) *Attorney, Agent, or Firm*—Wiggin and Dana LLP; Gregory S. Rosenblatt

(57) ABSTRACT

A combination of a racecourse and a plurality of racing vehicles where the racecourse has a predefined path defined by at least one gate. This gate further includes a unique identifier. Each of the plurality of racing vehicles has a sensor capable of detecting the unique identifier and the sensor is further coupled to a logic circuit and to a transmitter. A scoreboard has receiver to receive information from the transmitter and display that information, such as lap speed and ranking, according to a desired format. Alternatively, the unique identifier is mounted to the racing vehicle and the sensor to the gate.

6 Claims, 7 Drawing Sheets

RACECOURSE LAP COUNTER AND RACECOURSE FOR RADIO CONTROLLED VEHICLES

CROSS REFERENCE TO RELATED PATENT APPLICATIONS

This patent application is a divisional application of U.S. Pat. No. 7,072.792 that was filed on Dec. 23, 2003, which claims priority of U.S. Provisional Patent Application Ser. No. 60/436,351 that was filed on Dec. 24, 2002. The disclosures of both documents are incorporated by reference in their entireties herein.

BACKGROUND OF THE INVENTION

1. Field of the Invention

This patent application relates to systems for compiling and displaying racecourse data. More particularly, this invention relates to methods to define a racecourse along a predefined path. As race vehicles traverse this path, information regarding the race vehicles, such as speed and ranking, is communicated to a scoreboard for display.

2. Description of Related Art

While racecourse radio controlled (R/C) cars and other racing vehicles such as R/C boats, trucks and motorcycles have been a consistently popular over the years, a simple, inexpensive, way to define a racecourse and to count laps of a race has not been readily available. Simple approaches, such as placing cones or drawing the course with chalk on asphalt have as one obvious disadvantage that it is easy for a competitor to "cut" a corner and cheat the course.

More advanced hobbyists generally construct racecourses using wood to define sidewalls of the track. For a course for off-road type trucks, plastic tubing that is generally partially buried in dirt, typically defines the path of the racecourse. Constructing such racecourses are time consuming and requires significant effort and expense. Further, such courses are not readily portable.

Lap counting methods are well known for R/C cars. While many devices are currently available they can be expensive.

Micro-Reality racing (also known as Micro Reality Entertainment Systems of the United Kingdom) sells a product that embeds a loop of wire under the finish line of a racetrack. Each car is equipped with a radio frequency emitter transmitting at a different frequency. The loop acts as an antenna and receives the signals from each car. The scoreboard receives these signals and counts the laps in the race. This method is expensive utilizing relatively costly transmitting and receiving radio electronics.

KO Propo Ltd of Middlesex, United Kingdom manufactures a system where a loop antenna for the racecourse is sensitive enough to detect oscillations of a crystal in the electronic radio signal transmitting circuit in the car. Each car has a slightly different frequency. The electronic sensing circuit attached to the loop antenna analyzes the signals and sends information regarding which car has passed the loop antenna to a computer program. The computer program tracks the race and displays the lap results and times. The electronics module to receive and process these faint signals is expensive and time consuming to build.

A system manufactured by TrakMate of British Columbia, Canada, uses a laser light beam that is broken by a flag attached to a car as it passes the finish line. Different cars in the race have different height flags. The information from the electronic circuit detecting the laser beam is sent to a computer to display the results. Once again the receive optics and electronics for this device is costly.

Another system uses a line of LEDs (Light Emitting Diodes) that are suspended above the finish line to form a curtain of light at the finish line that the car must move through in order to record a lap. On each car is a detector that senses the light and sends a signal to the scoreboard when the light is received. The structure to suspend these LEDs is relatively large and costly.

U.S. Pat. No. 5,435,553 to Arima et al. discloses a racecourse for operator driven race cars, such as go-karts, having position indicating markers positioned about the racecourse. Sensors on the racecars detect the markers and transmit detection of the marker to a fixedly mounted second transmitter that then transmits information such as position and ranking to a host computer. The disclosure of U.S. Pat. No. 5,435,553 is incorporated by reference in its entirety herein. Due to the fixturing of the markers and second transmitters, this system is not amenable to rapid reconfiguration of the racecourse and may lead to driver boredom after a number of runs around the same predefined path. Also, the second transmitter adds expense to the entire system.

There remains a need for a system to track a plurality of racing vehicles on along a predefined patent path that does not suffer from the limitations of the above described prior art.

SUMMARY OF THE INVENTION

Accordingly, it is an object of the invention to provide a method to monitor and display the speed and position of a vehicle traversing a predefined path. A second object of the invention is for the predefined path to be easily changed.

Among the features of the invention are that the method for monitoring information regarding the vehicles has a minimum impact, if any, on the operation of the vehicles and the information is readily displayed at a remote location. This feature is achieved through the combination of a sensor and a unique identifier, one of which is located on the vehicle and the other on a gate to be traversed by the vehicle. Either one of the sensor or the unique identifier may be powered and the other passive. Another feature of the invention is that it is particularly suited for monitoring the speed and relative position of a number of racing radio controlled vehicles traveling along a predefined racecourse and displaying information regarding speed and ranking on a remote scoreboard.

Advantages of this invention include creation of a race circuit for R/C cars easily and inexpensively both indoors and outdoors on surfaces, including but not limited to, asphalt or dirt. Another advantage of this invention is that it provides a relatively inexpensive lap counter to track and display the position and race times of the R/C cars in the race. Another advantage of this invention is that it minimizes the amount of weight that must be carried by a car for an identifying mark.

In accordance with a first embodiment of the invention, there is provided a combination of a racecourse and a plurality of racing vehicles. This combination includes the racecourse having a predefined path defined by at least one gate, each one of the at least one gates including a unique identifier. Each one of the plurality of racing vehicles having a sensor capable of detecting the unique identifier. The sensor coupled to a logic circuit and to a transmitter. A scoreboard includes a receiver that receives information from the transmitter and displays the information according to a desired format.

In accordance with a second embodiment of the invention, there is provided a combination of a racecourse and a plurality of racing vehicles. This combination includes each one of the plurality of racing vehicles having a unique identifier and the racecourse having a predefined path defined by at least one gate. Each one of the at least one gates including a sensor capable of detecting the unique identifier. A scoreboard includes a receiver that receives information from the transmitter and displays the information according to a desired format.

In accordance with a third embodiment of the invention, there is provided a method for detecting the position of a moving object traveling along a predefined path. This method includes defining the path with a plurality of gates. Each of the gates includes a unique identifier. The moving object is provided with a sensor capable of detecting the unique identifier and communicating identification of the sensor to a logic circuit supported by the moving object. This information is then transmitted from the logic circuit to a display and displayed in a desired format.

The above-stated advantages will be more apparent from the specification and drawings that follow.

DETAILED DESCRIPTION OF THE INVENTION

Figure 1:
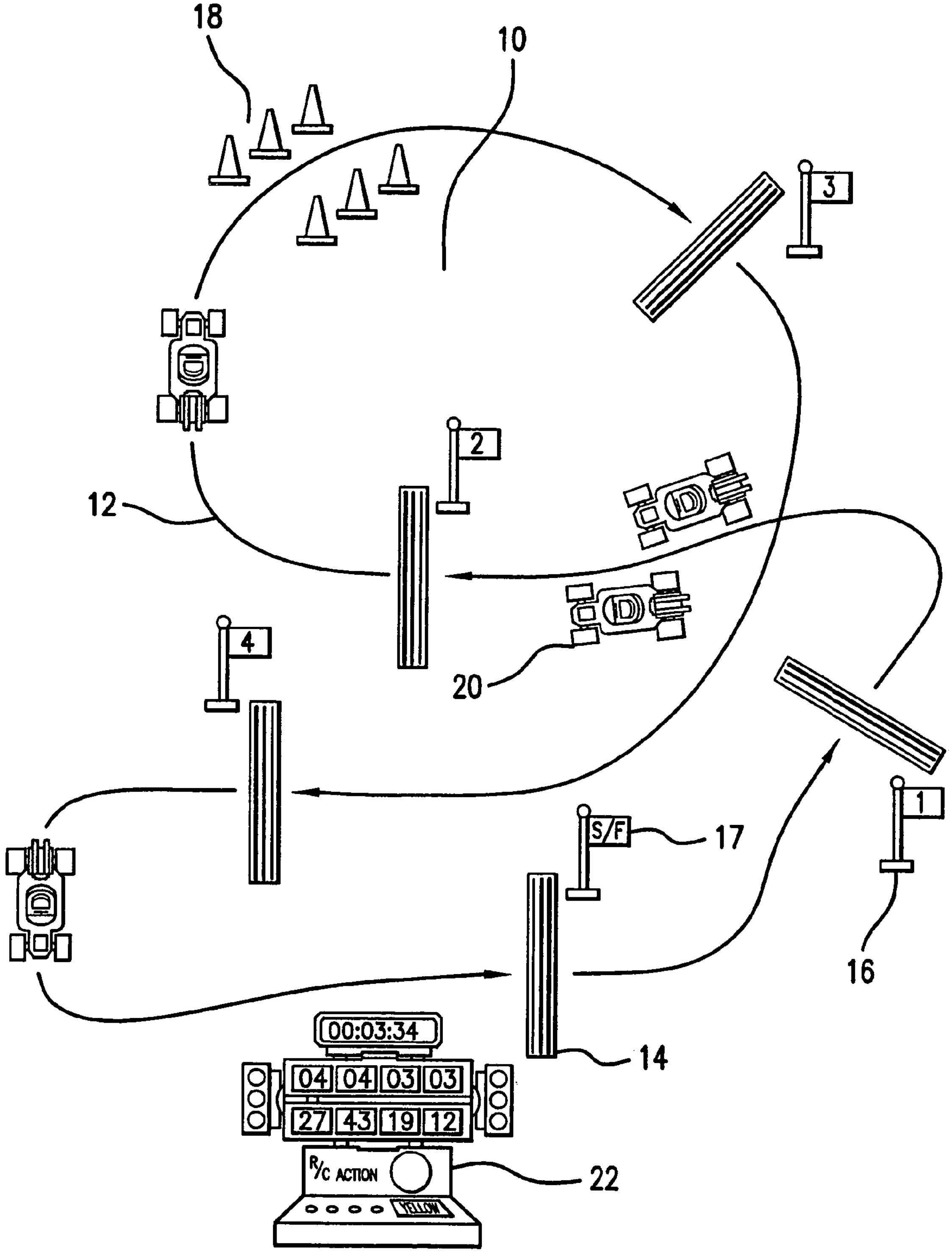
FIG. 1 shows in top planar view a racecourse in accordance with the present invention.

In accordance with the invention, there is a combination of a racecourse and a plurality of racing vehicles. With reference to FIG. 1, the racecourse 10 has a predefined path 12 that is defined by at least one marker or gate 14. Unlike prior art racecourses requiring permanent fixturing to define the path, the present path is defined by gates 14, that are preferably easily moved as described below. The order the vehicles must negotiate the course is given by a number marker 16. The predefined path 12 is thus defined by this order. One lap of the course is completed when all the gates have been crossed by a vehicle in the proper order, preferably terminating at a start/finish gate 17.

While the traditional wood or plastic walls to define the course are no longer needed, to add visual interest to the race, borders 18 of the race circuit may be formed by any convenient method. One simple method is lines of chalk drawn in the form of a track on asphalt or another hard surface. Another simple approach is placing cones on the ground that the cars, or other racing vehicles, must navigate to complete the circuit. For more elaborate tracks the present invention can incorporate some elements using traditional R/C course construction techniques such a making a wooden platform with walls. For dirt tracks, dirt can be moved about to form the roadways of the race circuit with side walls of these roadways defined by mechanical barriers typically made of wood or plastic.

Racing vehicles 20 travel one or more circuits (commonly called laps) about the racecourse 10. The racing vehicles may be radio controlled, such as R/C cars, driven, such as go-karts or motocross, travel along a waterway, such as racing boats, or any other vehicle that may be controlled to travel along a predefined path. As described below, a combination of a sensor and a unique identifier, one positioned on the vehicle and the other on the gates, transfers information to a scoreboard 22 that displays the information in a desired format. Such information may include number of laps completed, vehicle speed and vehicle ranking.

There may be a single gate 14, that typically defines a start/finish point, or a plurality of gates that may be traversed one or multiple times. Typically, the gate 14 is sufficiently wide for more that one racing vehicle to traverse the gate at the same time. The gates may be strips across the racecourse, marker cones, elevated structures or any other structure that defines a path for the racing vehicles to follow. The gates are numbered 16 and the vehicles traverse the gates in the appropriate order (for example, the order in which the course markers are numbered) to complete a lap of one circuit. The gates typically include visual indicators, such as arrows, indicating the direction in which the vehicles must move in order to count towards completing the lap. In one embodiment, the gates are passive, requiring no power and can be positioned in any configuration indoors or outdoors. For example, a complex race circuit can be defined on any relatively flat surface by the order in which the gates must be crossed. For added fun cones and flags can be added to the course to further clarify the route the R/C cars must take.

Figure 2:
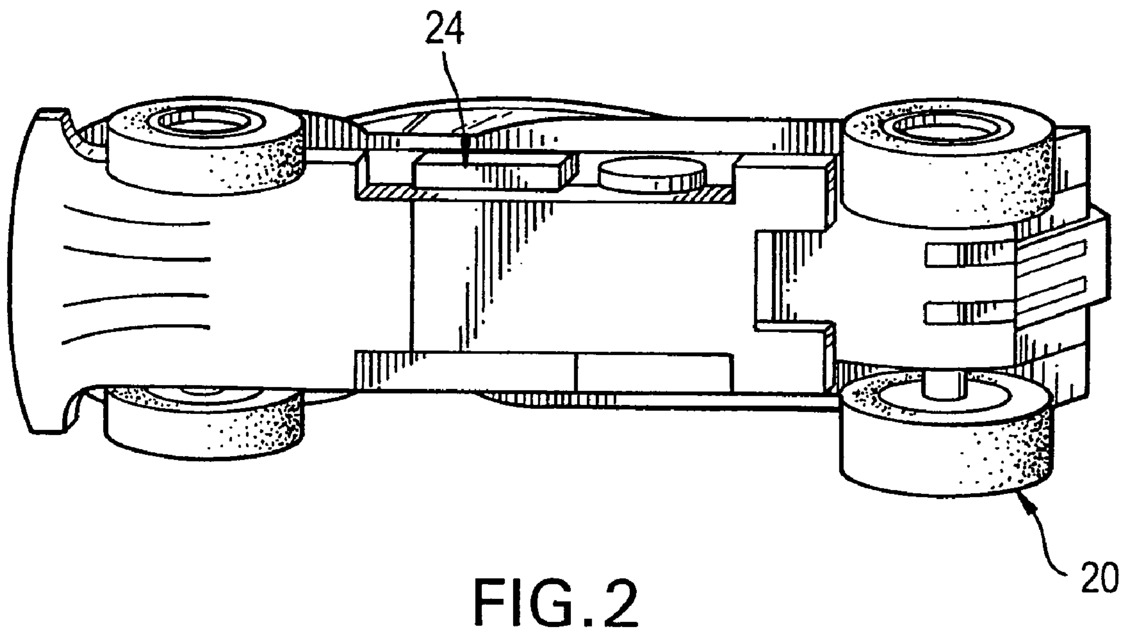
FIG. 2 shows in bottom planar view a vehicle including a sensor in accordance with the invention.

In accordance with a first embodiment of the invention, each one of the racing vehicles 20 have attached thereto a sensor capable of detecting a unique identifier and each gate 14 includes a unique identifier. FIG. 2 schematically illustrates the underside of vehicle 20, more particularly an R/C car, that has a sensor 24 in the form of an optical emitter. In this embodiment, the gates include as a unique identifier a unique reflective strip. The uniqueness of the reflective strip may be due to color, pattern (such as a bar code) or other unique identifier. Each vehicle can also have an indicator mounted to the vehicle that provides a visual or audio feedback to the race participant that the gate has been successfully crossed.

Figure 3:
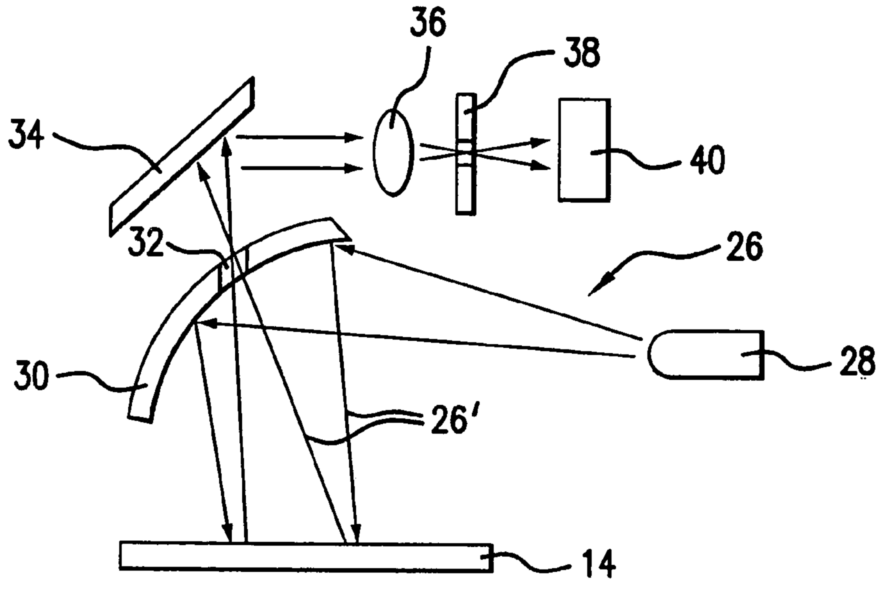
FIG. 3 schematically illustrates a method to sense optical information in accordance with the invention.

FIG. 3 schematically illustrates the internal workings of the optical emitter. Light 26, such as from a light emitting diode 28, is directed towards a generally concave mirror 30, which redirects this light towards the passive course marker with reflective target portion of gate 14. The reflected light 26' from the course marker/target passes through an aperture 32 in the concave mirror 30 and is further reflected by mirror 34 and collected by lens 36 and focused through an aperture window 38 on to a photo detector 40. The photo-detector 40 transmits information regarding the unique identifier to a logic circuit contained within the vehicle. This logic circuit determines the location of the vehicle and vehicle speed based on this information and transmits that information to the scoreboard.

Each course marker contains an optical pattern such as a bar code that is read by a miniature bar code reader built into each car. In one embodiment each vehicle contains a microprocessor that analyzes the bar code signal to determine the identification, such as the marker number, of the course marker that was passed over by the R/C car. The microprocessor circuit further contains a memory register or other suitable memory device to count the number of course markers that are passed by each R/C car. When the final course marker is passed the R/C car sends a radio signal (lap signal) to a scoreboard. The scoreboard then shows the lap position and time of each car in the race.

Figure 4A:
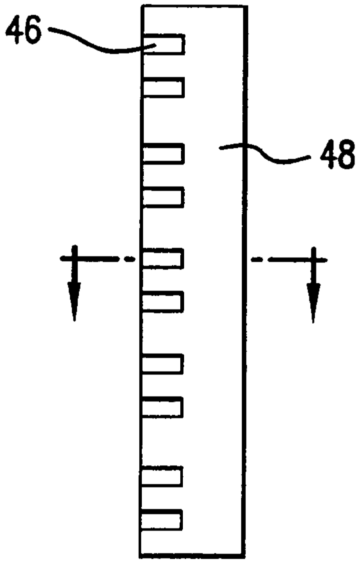
FIGS. 4*a* and 4*b* shows in top planar view and cross-sectional representation a bar code as a unique identifier.
Figure 4B:
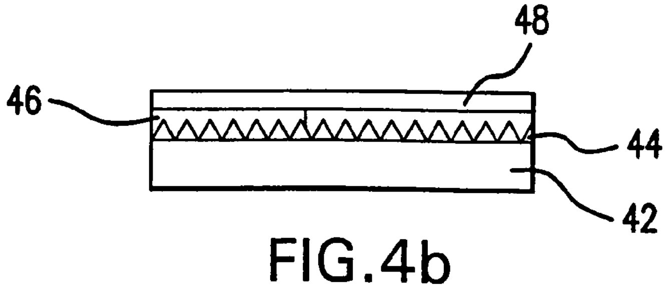

FIG. 4*a* shows in top view and FIG. 4*b* shows in cross-sectional view of a unique identifier portion of a gate in the form of a bar code. A base portion 42 is formed from plastic or other suitable material and patterned with a prismatic surface 44. The bar pattern is formed by the selective application of a reflective coat of shiny material 46. The prismatic surface 44 acts as a retro-reflector enhancing the signal strength of the returned light. A topcoat daylight filter 48 can block all frequencies of light other than those emitted by light emitting diode 28 (in FIG. 3). In a preferred embodiment, this LED emits in the infrared spectrum.

Figure 5:
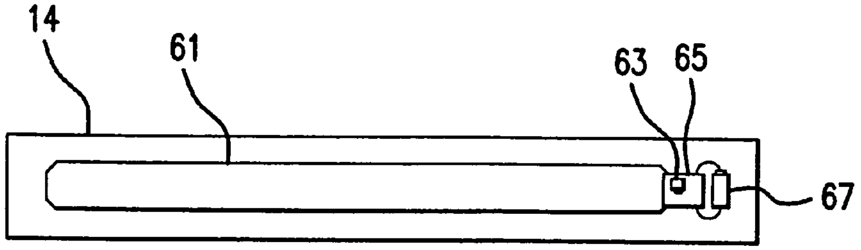
FIG. 5 shows an actively powered gate in accordance with an embodiment of the invention.

In certain environments there may be too much dirt and mud to allow a bar code scheme to work reliably. In these cases an actively powered gate 14 as shown in FIG. 5 can be used. Here a loop of wire 61 is extends across the length of the gate and functions as an antenna to transmit a unique identifier signal to the racing vehicle. A battery 67 powers the gate electronics 65. Alternatively. If the system is used in sufficient daylight or a bright room, solar power cells could be used to power the gate electronics.

In this embodiment the unique gate identifier signal is determined by a crystal 63, which is a component in the gate electronics 65. The vibrational characteristics of the crystal determine the frequency of the radio signal that the gate 14 broadcasts. The long parallel configuration of the wire loop 61 and the relatively weak energy level confines the broadcast signal to the general neighborhood of the gate. By placing a different crystal in each gate, the vehicle sensor can distinguish each gate by the different frequency transmitted.

While I have described here two methods for sensing the proximity of a vehicle to a gate and uniquely identifying one to the other, any similar method such as, but not limited to, LED light emission and detection, sensing the presence of a magnetic strip, such as used in retail product security application, or passive re-transmitters, such as used in toll booths can be used by persons skilled in this art.

The race participants must ultimately receive the information that the vehicle has successfully passed a gate immediately upon this event happening. This can be communicated to the participant in a number of ways. In the preferred embodiment an indicator such as a flag that lowers and rises is mounted to the vehicle to indicate this. Alternatively, the scoreboard can receive a signal to display either from the vehicle or from the gate if it is set to sense the presence of the vehicle passing.

Figure 11:
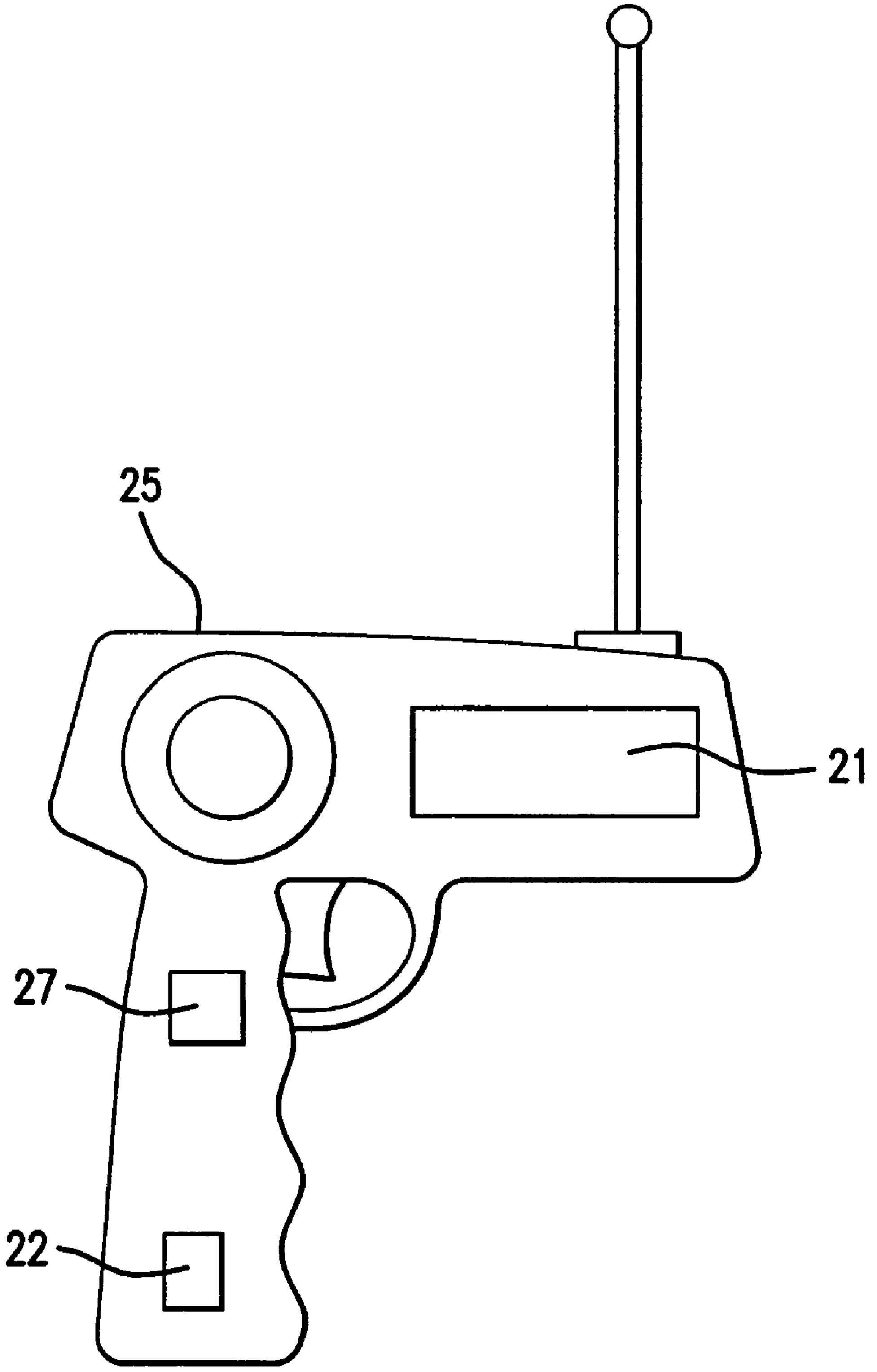
FIG. 11 illustrates a handheld radio controller intended to receive and display racecourse information.

The vehicles racing on a circuit can be configured to each transmit at a different frequency. Each vehicle can transmit its signal to the scoreboard that receives signals of the various frequencies being transmitted. Likewise, the gates can each transmit at a different frequency. As an alternative to transmission to the scoreboard, as illustrated in FIG. 11, the signals can be sent to a handheld radio controller 25 configured with receiving electronics 22. Once the controller 25 receives this signal indication that the gate has been crossed by the vehicle, this information can be communicated to the race participant either by a graphic display 21 or by a vibrating element 27 within the controller 25 that is either audible or felt in the hand of the participant.

Figure 6:
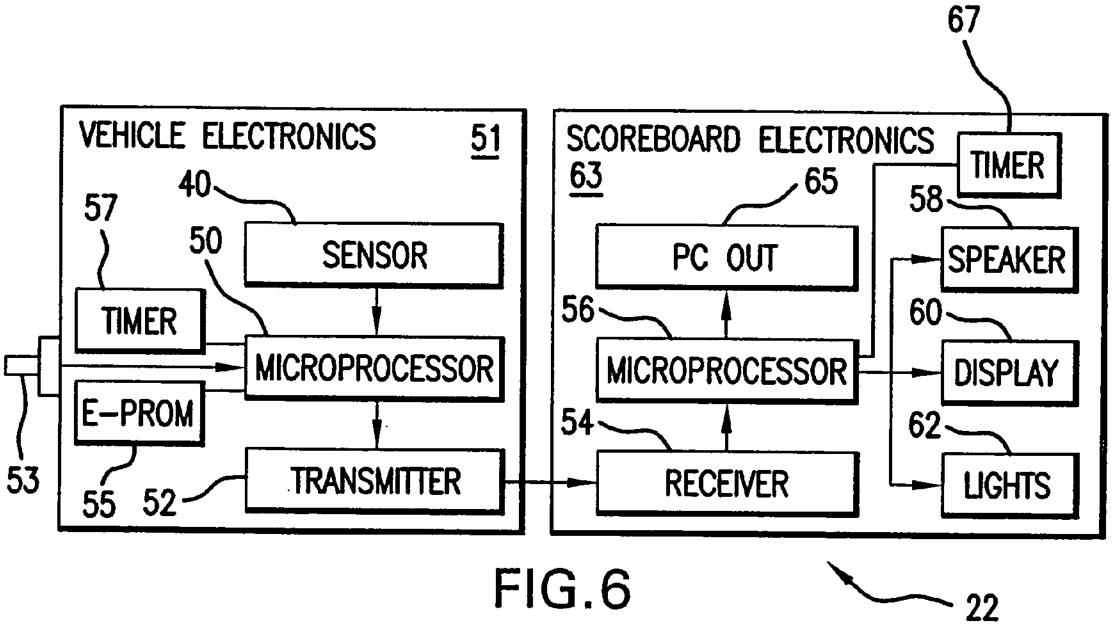
FIG. 6 schematically illustrates the transmission of information from a racing vehicle to a scoreboard.

However, transmitting a number of different frequencies over the large area of an outdoor racecourse adds expense and complexity to the system. A desirable feature of this system is that in one preferred embodiment, a less expensive approach which uses a single frequency and low power signal to communicate the lap progress to the scoreboard is herein disclosed. As schematically illustrated in FIG. 6, a microprocessor 50 in the vehicle electronics module 51 receives a signal from a sensor 40, mounted to the vehicle when the sensor is brought into close proximity to the gate 14. The vehicle electronics 51 decode the signal from the sensor so that the microprocessor 50 can determine the unique identifier for the gate that has been crossed. The microprocessor 50 counts the number of gates that have been crossed in the proper order. If a race participant takes a gate out of order or misses a gate, that participant can go back and retake that gate and continue the race from there with the microprocessor allowing for this and properly counting gates from that point forward for that vehicle.

Once the vehicle reaches the start/finish gate 17 (FIG. 1), the microprocessor instructs a low power single frequency transmitter 52 to send a signal to the scoreboard receiver 54. This signal comprises the number of gates successfully completed by the vehicle and a unique vehicle identifier. This identifier is typically the car number. It is set within the vehicle electronics 51 by a non-volatile memory such as an e-prom 55. A small push button 53 can be used to set the vehicle identifier number. Dip switches or other permanent identifier code could be used here as well. If the e-prom approach is taken the transmitter 52 should transmit the identifier number to the scoreboard for display while this number is being set.

The signal from the receiver 54 is decoded by the scoreboard microprocessor 56 and so long as the vehicle has completed the appropriate number of laps for the race the scoreboard display 60 shows the updated lap information for that vehicle. In the case that two or more cars cross the finish line (final course marker) at the same time the codes transmitted by the cars can be comprised of a series of short bursts each comprising the same basic information about the lap that car just completed but separated by known time spacing. Each burst will be coded with the car number and time spacing information. If any two bursts overlap, the scoreboard will contain an electronic signal analysis module that can ignore that data and look to other bursts before and after to obtain the data garbled by overlapping bursts.

For larger installations, the scoreboard can have separate display modules that can be mounted on a wall or other location that can be seen by viewers of the race.

When a vehicle passes a course marker the signal from the sensor 40 is decoded by the car microprocessor 50. A lap signal and/or other information is sent by the transmitter 52 to the scoreboard receiver 54. The signal from the receiver 54 is decoded by the scoreboard microprocessor 56 and the results are displayed on the scoreboard in the forms such as of sounds from speaker 58, digits on the display 60 and lights 62 on the scoreboard 22.

To add additional realism and fun to the system, the microprocessor sends event appropriate sounds to the speaker 58. The scoreboard speaker could simulate a racecourse announcer and make announcements such as “Ready, Set, Go!” and other announcements relative to the various positions of the vehicles in the race. For example “car 24 is still in the lead with two laps to go!” Other sounds of the racecourse can be produced such as the roar of the engines and the crowd. In the case of say, popular and well known professional race drivers, if the vehicle identifier set in the e-prom 55 of the vehicle electronics matches the car number of a well know racer specific announcements that refer to that professional racer could be made.

Drag racing is also quite popular. In drag racing the key to winning is to get a good start, and competitors are known to occasionally "jump" the starting gate for a "false start". To facilitate drag racing one would use one regular gate for the starting line and the start/finish gate for the finish line. When in "Drag" mode, the Scoreboard 22 indicates the start of the race with a speaker announcement and the traditional "Christmas tree" countdown lights 62. At the start of the race, a timer 67 begins a count. When the vehicle drag racing crosses the gate used as the starting line the timer 57 in its electronics module 51 begins counting. When the vehicle crosses the finish gate, its transmitter sends the usual signal to the scoreboard receiver 54 but also adds the time elapsed since the beginning of the race to this signal. The scoreboard microprocessor 56 records the finish time for this vehicle from its own timer 67. In comparing the two times, if the scoreboard microprocessor 56 find's the vehicle's timer is less than the scoreboard's internal timer than a false start message is shown on the scoreboard display 60 for that vehicle.

To calculate the speed of the vehicle as it passes a gate the vehicle microprocessor 50 can use the timer 57 to record the elapsed time since the previous gate. The vehicle microprocessor 50 can transmit this information to the scoreboard 22. If the distance between gates is known to the scoreboard microprocessor 56, the velocity between gates is calculated and displayed. This distance can be coded into the scoreboard by the user or it could be a fixed distance and would require the user to place the appropriate gates a fixed distance apart.

If the bar-code gate approach is used, the distance between the first and last bar for a given gate is known. The timer circuit 57 in the vehicle electronics 51 is then invoked to count the time it takes to transverse this distance and this information is transmitted to the scoreboard.

While the sensor appended to the vehicle is quite small and light, an alternative embodiment reduces this weight to a negligible amount. In this alternative embodiment the unique identifier, such as a bar code or a reflective color strip, is affixed to the bottom of each vehicle. This target is for example, a stick-on label with negligible weight. Each course gate contains a transmitter that sends a radio signal to the scoreboard indicating that a certain car has passed over the course marker.

Figure 7:
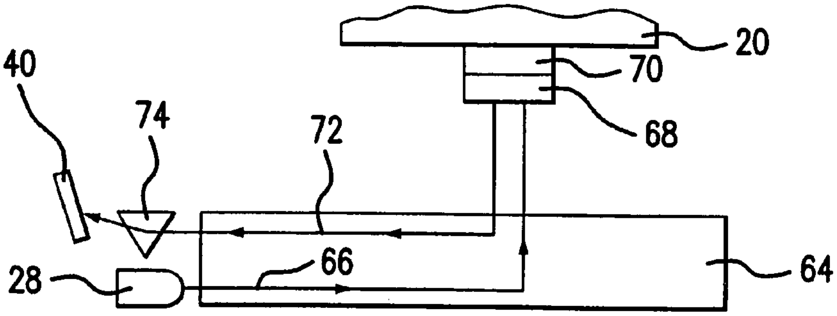
FIG. 7 schematically illustrates a color filter on a racing vehicle as a unique identifier.
Figure 8A:
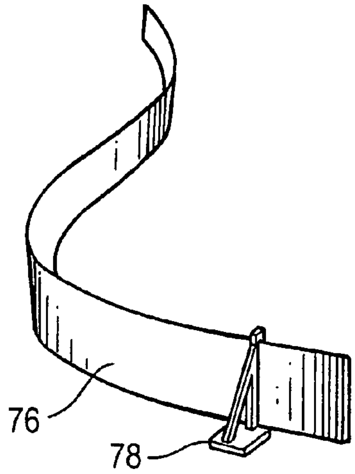
FIGS. 8*a*-8*d* illustrate components of a portable race track.
Figure 8B:
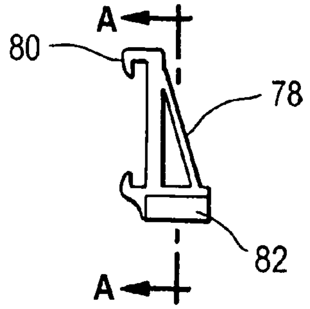
Figure 8C:
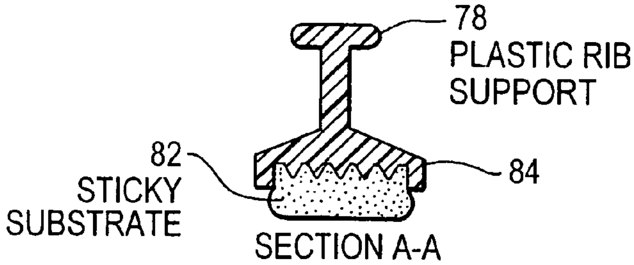
Figure 8D:
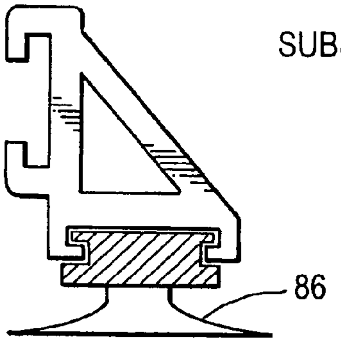

With reference to FIG. 7, one method to achieve this embodiment includes placing along the length of the gate a single strip of optical conduit 64 that is generally flat and similar in operation to side illuminated diffusive backlights for liquid crystal displays. On the input side an LED 28 projects white light 66 towards the strip. The strip disperses the projected light and generally directs it up along the length of the course marker. When a vehicle 20 passes the projected light, a portion of the projected light passes through a color filter 68 and is reflected off a mirror 70 on the vehicle and back down into the conduit. The color filter 68 serves as the unique identifier, each vehicle having a different color filter. The conduit 64 then directs the reflected light 72 out of the conduit and/or towards a photo-detector 40. An electronic circuit analyzes the signal received by the photo-detector and determines which vehicle crossed the course marker.

In the case of a color marker, a prism 74, diffraction grating, individual color filters or other color dispersing device can break the light into its constituent colors and direct the spread color spectrum across two or more photo sensors to distinguish the cars by their colors.

In an embodiment where only one course marker is used, that course marker is positioned at the finish line. The electronic circuit within the course marker can be wired directly to the scoreboard. Alternatively, a number of these active course markers can be used to form a race circuit. Each course marker has a number or other identification means and a direction indicator on it. The vehicles complete a lap by passing over each course marker in the proper or predefined order and direction. As each vehicle passes a radio signal containing information identifying the vehicle and the marker number or identifier is sent to the scoreboard. The scoreboard then displays information regarding the lap and race time information for each vehicle in the race. A further alternative embodiment comprises an LED positioned in the vehicle, preferably pointing downward and transmitting a code indicating the car number to the course marker. The course marker in this embodiment is acts to decode the detected signal, and then relay this information to the scoreboard 20.

In both of the above embodiments optical signals are used to determine that a car has passed over the course marker. However, in outdoor environments or if the track is constructed predominantly of dirt, optical approaches would be problematic. The same basic principle can be used in the above embodiments but instead of optical frequency signals, radio frequency signals can be used. As an example of this alternative embodiment, a wire placed in the course marker senses a coded radio frequency signal from a passing car indicating the number of the passing car. The novelty of this embodiment includes an electronic circuit in the course marker that sends the information to the scoreboard via a radio signal. The present inventive method may also have more than one of these course markers with an electronic circuit used to define a race circuit.

This is the inverse of the previously described embodiment where the course markers use a loop of wire as a transmitter of a radio signal coded to indicate the number of the course marker. The vehicles then record the number or identifier of the course marker as it is passed. At the final course marker the vehicle then sends a record of passed course markers to the scoreboard. This allows for a very low use of power in the transmitter since the scoreboard can be placed generally near (for example, within about 20 feet) the start finish line 17. However, for a more ambitious system, the record of passed course markers could be sent to the scoreboard at other times as can be determined by one of ordinary skill in the art. Additionally, such times could be set by the user of the race circuit.

To further reduce the cost of a race game, a single course marker (finish line) can be hardwired to a scoreboard using other commercially available or appropriate technology or herein described method for tracking the laps of the passing cars. Two parallel thin strips (preferably plastic) are now used to define either of the sidewalls of the course. These strips are held generally perpendicular to the racing surface by a variety of means depending on surface. On a table, top posts holding up these strips could, in the preferred embodiment, use suction cups to anchor the strips to the table. On a carpet or rough floor or outdoors on asphalt, a weighted base with a post may be used to hold and position the thin strip in the race circuit. Outdoors, on grass or dirt, stakes can be hammered into the ground. The stakes can be configured with means on the end sticking out of the ground to accept and hold the strip and to define the sidewall of the race circuit.

To make the races more fun bridges, jumps, over passes, chicanes, four way intersection and other similar road features can be produced in model scale, typically from plastic with means to accept the thin strips and connect to the race circuit. Further, the thin strips can be manufactured in an extruding process and made in relatively long rolls at very low cost. However, other suitable manufacturing methods may be used.

Figure 9:
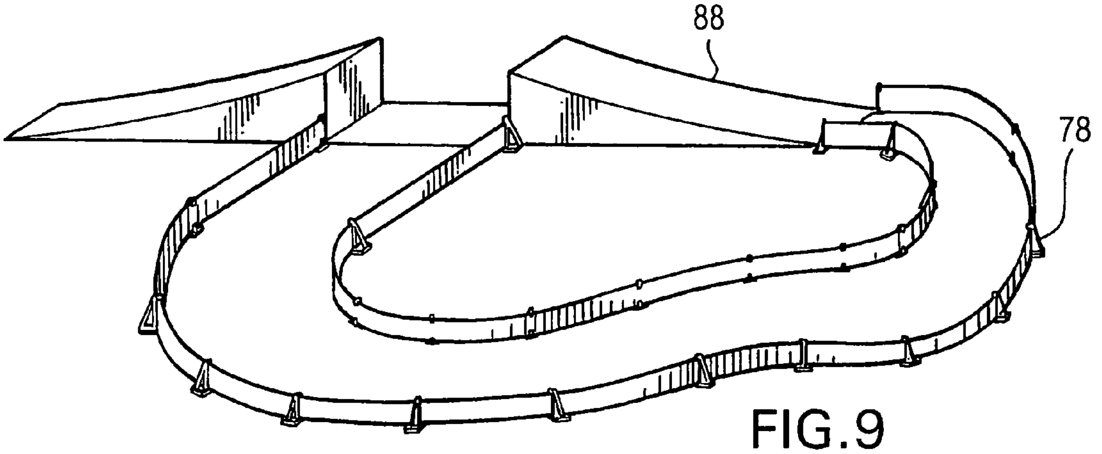
FIG. 9 illustrates a portion of an assemble racetrack using the components of FIGS. 8*a*-8*d*.

An approach that is especially good for micro racers on the table-top is illustrated in FIGS. 8*a*-8*d* and 9. FIGS. 8*a*-8*d* illustrate a portion of a race circuit partially defined by a flexible strip 76. The flexible strip 76 is supported by a stanchion 78 with quick release attachment 80. The stanchion is held in place by a base 82 that in one embodiment is comprised of a gooey sticky plastic. As such plastics that do not adhere by adhesive methods will be held in place to the stanchion by interlocking ribs 84. An alternative method for mounting includes a suction device such as a suction cup base 86. FIG. 9 illustrates a pair of flexible strips 76 defining a race circuit. The strips 76 are held in place by a series of stanchions 78. The strips 76 are connected to a jump 88 as part of the race circuit.

Figure 10:
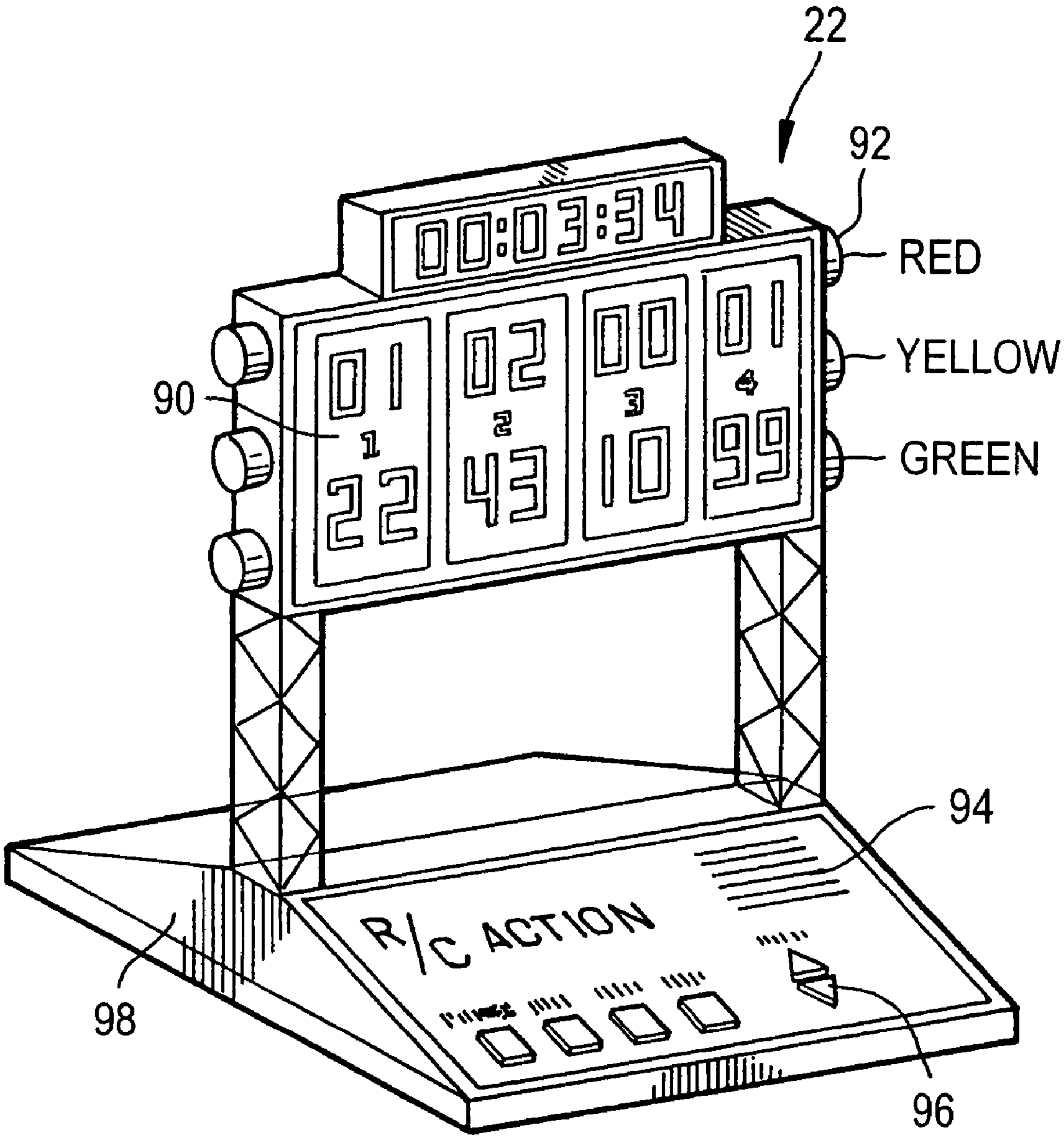
FIG. 10 illustrates a portable scoreboard in perspective view.

To give audio feedback the scoreboard can include a speaker that emits a unique or different tone for each car as a course marker is passed. In another embodiment the course markers could each have a speaker that emits a unique or different tone for each car as it passes the course marker. The speakers could also be used to broadcast sounds including, but not limited to, realistic race sounds, voice announcements, and crowd noises. One scoreboard 22 embodiment is illustrated in FIG. 10, to include display 90 indicator lights 92, speaker 94 and control buttons 96. For portable applications, the scoreboard 22 may be battery powered with batteries encased within the base 98.

When racing R/C cars or other remotely driven vehicles, the individual remote controls used by each participant to drive his or her car could have an LCD display or other suitable display that receives information from the main scoreboard or from the participant's car and displays to the participant his or her lap time, race position, and other related information.

Personal computers (PCs) are commonly used with prior art lap counting systems. The scoreboard as disclosed in FIG. 6 has an output 65 that can be connected to a PC to store and display race data, both during and after the race. If a PC is fitted with a radio frequency receiver, it could act as the scoreboard if properly programmed as it has the required microprocessor and timer circuits and can display the race data.

While the invention has been described in terms of tracking the progress of a racing vehicle, it is equally applicable to other applications where the position of a moving object relative to other objects much be known, for example in automated manufacturing where there is needed a method for detecting the position of a moving object traveling along a predefined path according to the steps of defining the path with a plurality of gates, each gate including a unique identifier, providing the moving object with a sensor capable of detecting the unique identifier and causing the sensor to communicate identification of the sensor to a logic circuit supported by the moving object, transmitting information from the logic circuit to a display and displaying the information in a desired format.

Accordingly, the invention as set forth in the appended clams is not limited to the precise details of construction set forth above as such other variations and modifications as would be apparent to one skilled in the art are intended to be included within the spirit and scope of the invention as set forth in the defined claims.

What is claimed is:

1. A combination of a racecourse and a plurality of racing vehicles, comprising:

said racecourse having a predefined path defined by at least one gate, each one of said at least one gate including a unique identifier;

each one of said plurality of racing vehicles having a sensor capable of detecting said unique identifier, said sensor coupled to a logic circuit and to a transmitter, wherein the logic circuit transmits vehicle race progress information less frequently than at each gate passing; and a scoreboard having a receiver capable of receiving information directly from said transmitter and displaying said information according to a desired format, wherein a time to travel between gates determined by said racing vehicle ($T_1$) is compared to said time to travel between gates determined by said scoreboard ($T_2$) and displaying a false start if $T_2$ is less than $T_1$.

2. The combination of claim 1 wherein said racecourse has a starting line gate and a finish line gate.

3. The combination of claim 2 wherein race progress data is transmitted only at or beyond said finish line gate.

4. The combination of claim 3 wherein a timer in said racing vehicle electronics module determines time $T_1$ and said transmitter transmits $T_1$ to said scoreboard.

5. The combination of claim 4 wherein a velocity of said racing vehicle is displayed on said scoreboard based on a known distance between said starting line gate and said finish line gate and said race progress data that includes elapsed time.

6. The combination of claim 4 wherein said racecourse is configured as a drag strip.

* * * * *